| United States Patent [19] | [11] Patent Number: 6,142,189 |
| Bhattacharyya | [45] Date of Patent: Nov. 7, 2000 |

[54] METHOD FOR MANUFACTURING A HIGH PERFORMANCE CROSSLINKED THERMOPLASTIC HOSE AND A HIGH PERFORMANCE CROSSLINKED THERMOPLASTIC HOSE PRODUCED THEREBY

[75] Inventor: Jayanta Bhattacharyya, Ocala, Fla.

[73] Assignee: Dayco Products, Inc., Dayton, Ohio

[21] Appl. No.: 09/353,427

[22] Filed: Jul. 15, 1999

[51] Int. Cl.[7] .............................. F16L 9/00; F16L 11/00
[52] U.S. Cl. ........................................ 138/177; 138/137
[58] Field of Search ............................. 525/453, 457, 525/424, 420, 437, 440; 138/141, 126

[56] References Cited

U.S. PATENT DOCUMENTS

| 3,972,757 | 8/1976 | Derderian et al. | 156/143 |
| 3,988,188 | 10/1976 | Johansen et al. | 138/126 |
| 4,101,699 | 7/1978 | Stine et al. | 428/36 |
| 4,110,396 | 8/1978 | Reynolds | 264/236 |
| 4,204,010 | 5/1980 | Kramm et al. | 427/44 |
| 4,306,052 | 12/1981 | Bonk et al. | 528/67 |
| 4,374,167 | 2/1983 | Blegen | 428/141 |
| 4,537,736 | 8/1985 | Peltzman et al. | 264/130 |
| 4,567,234 | 1/1986 | Meunier | 525/73 |
| 5,153,261 | 10/1992 | Brooks | 525/28 |
| 5,476,121 | 12/1995 | Yoshikawa et al. | 138/138 |
| 5,516,857 | 5/1996 | Mann | 525/424 |
| 5,683,773 | 11/1997 | Kemper | 428/36.91 |

*Primary Examiner*—Andres Kashnikow
*Assistant Examiner*—Davis Hwu
*Attorney, Agent, or Firm*—Joseph V. Tassone

[57] ABSTRACT

A method for manufacturing a crosslinked thermoplastic hose capable of withstanding high temperatures and having chemical, abrasion, and tear resistant characteristics, for use in a high performance hose, comprising adding to an extruder a mixture comprising a thermoplastic polymer and a crosslinking agent; wherein the crosslinked hose is formed in the absence of a mandrel is disclosed.

21 Claims, No Drawings

METHOD FOR MANUFACTURING A HIGH PERFORMANCE CROSSLINKED THERMOPLASTIC HOSE AND A HIGH PERFORMANCE CROSSLINKED THERMOPLASTIC HOSE PRODUCED THEREBY

BACKGROUND OF THE INVENTION

1. Field of the Invention

The present invention relates to high performance, crosslinked thermoplastic hoses capable of withstanding high temperature and having chemical resistant characteristics, and more particularly, to a method for preparing such crosslinked thermoplastic hoses.

2. Description of the Prior Art

Hoses, particularly curved hoses such as those used to transport fluids in automobiles, typically, are manufactured by positioning a pre-cut length of uncured hose over a curved mandrel and then heating the mandrel and curing the hose so that the hose retains its desired shape. The hose may be solely an elastomeric hose or it may be surrounded or have incorporated therein a twined reinforcement. Optionally, a cover of the same or different material may surround the hose. Typically, the hose is prepared from a heat curable elastomer by placing the extruded hose over the mandrel which is heated to cure the hose. The cured hose is then removed from the mandrel while the mandrel is hot to facilitate easy removal of the cured hose from the mandrel. One such method is described in U.S. Pat. No. 4,537,736 to Peltzman et al. Such hoses have been used in a wide variety of applications such as fuel feed hoses, torque converter hoses, air conditioner hoses, power steering hoses, etc. However, in general, such hoses do not have sufficient abrasion resistance necessary for some specialty hoses, nor do they exhibit high tear strength; and prior art attempts have failed to improve these characteristics beyond certain limits. For example, U.S. Pat. No. 5,476,121 to Yoshikawa et al discloses rubber hoses having improved barrier and flexibility performance by providing an inner hose of a synthetic resin having an outer peripheral surface, forming a thin film of silver or a silver base alloy on the outer surface of the inner hose, and heat curing the rubber layer.

High performance hoses such as power steering hoses require high resistance to both chemical and temperature degradation. At present, power steering hoses and other high performance hoses are made from compounded elastomers such as a chlorinated polyethylene, a chlorosulfonated polyethylene or similar materials capable of withstanding temperatures up to 300° F. and the chemical effects of power steering fluids. Chlorine-containing polyolefins including chlorinated polyethylene and chlorosulfonated polyethylene generally possess good mechanical properties, good compression set, good low temperature flexibility and good dynamic fatigue resistance. These materials also exhibit excellent aging, weathering, chemical and ozone resistance due to their saturated backbones. However, in order to withstand high temperatures of about 300° F. and chemical resistance to power steering fluids, hoses constructed of such materials must be built and vulcanized on a mandrel and then removed from the mandrel for additional processing. The manufacture of elastomeric power steering hose on a mandrel is described in U.S. Pat. No. 3,972,757 to Derderian et al. U.S. Pat. No. 5,683,773 to Kemper, and U.S. Pat. No. 4,110,396 to Reynolds teaches an automotive hose where the inner hose or, preferably, the cover portion is formed of an elastomer comprising a chlorinated polyethylene-based elastomer or polyether-based elastomer stabilized with barium sulfate.

In view of the cost associated with manufacturing high performance hoses such as power steering hoses, it is desirable to provide materials having the desired characteristics but which are easily formable without the use of a mandrel while providing improved performance and reduced overall costs.

SUMMARY OF THE INVENTION

In accordance with the present invention, high performance hoses such as power steering hoses having adequate properties in terms of heat and chemical resistance and superior properties in terms of abrasion and tear strength are prepared from thermoplastic polymers, and particularly from urethane polymers, wherein the reaction product is crosslinked with, for example, isocyanate during or subsequent to processing. There is no known thermoplastic material, when used alone, which will withstand the temperature and have sufficient chemical resistance for prolonged periods of time to the fluid associated with steering applications. However, it has been found that crosslinked thermoplastic polymers exhibit the necessary properties to withstand high temperature and resist degradation by the power steering fluid, when the crosslinked thermoplastic polymer is manufactured in accordance with the present invention. The thermoplastic polymer can be crosslinked in the matrix during extrusion of the polymer. In a preferred aspect of the present invention, the thermoplastic polymer is a thermoplastic polyurethane which is crosslinked during extrusion by adding a polyfunctional isocyanate to the thermoplastic polyurethane prior to or during processing. The high performance crosslinked thermoplastic material of the present invention exhibits the following advantages over plastic materials of the prior art:

(1) Superior heat resistance;

(2) Superior fluid resistance;

(3) Excellent adhesion to braid due to reactive sites;

(4) No additional step for crosslinking needed;

(5) Superior abrasion and tear resistance;

(6) The material can be extruded to close tolerance to form a hose without the need for a mandrel; and (7) Simplified forming process.

It is an object of the invention to provide a method for manufacturing a high performance, crosslinked thermoplastic hose which eliminates the processing steps required for prior art high performance elastomeric hoses.

It is another object of the invention to provide a high performance, crosslinked thermoplastic hose such as a power steering hose constructed from such crosslinked thermoplastic polymer.

According to the invention, the high performance, crosslinked thermoplastic hose can be formed to close tolerance by a simple extrusion process wherein a thermoplastic polymer is crosslinked during or subsequent to processing. The high performance, crosslinked thermoplastic hose of the present invention can be formed in a much simplified process as compared to prior art elastomeric hoses.

DETAILED DESCRIPTION OF THE INVENTION

High performance hoses such as power steering hoses are generally made out of elastomeric materials suitable to withstand the high temperature and resist chemical degradation associated with such hoses. In the manufacture of elastomeric hoses, the elastomer, before curing, is placed on a mandrel which is then heated and the elastomer cured to provide a hose which retains a desired shape. Elastomeric materials must be vulcanized in order to obtain the desired properties necessary for use in high performance hose. Thermoplastic materials, on the other hand, are designed to be used as such without undergoing vulcanization. The chemistry of thermoplastic materials are not really suitable for crosslinking; however, in some instances, thermoplastic materials can be forced to undergo crosslinking. In those instances where crosslinking of thermoplastic materials is observed, the overall properties of the crosslinked thermoplastic material tend to be superior to plastic materials, particularly, in terms of heat and chemical resistance. The crosslinked plastic materials are also superior to elastomeric materials typically used to make high performance hoses in terms of abrasion resistance and tear strength. Like elastomeric materials, crosslinked thermoplastic materials cannot be melt processed. Therefore, any crosslinking of thermoplastic materials must happen either during or after processing of the material.

In accordance with the present invention, a crosslinked thermoplastic hose having the physical properties and chemical resistance necessary for use in constructing high performance hoses, particularly, power steering hoses, is manufactured by a method which comprises adding a mixture which contains a thermoplastic polymer such as a thermoplastic polyurethane and a crosslinking agent such as an isocyanate to an extruder in which the reactive ingredients are mixed together during processing to form a thermoplastic high performance hose having the desired configuration wherein the hose is formed in the extruder without the need for a mandrel. Crosslinking of the thermoplastic material typically begins during the processing and extends over time in the formed hose. The hose then undergoes a reinforcing operation and a covering process. The covering is typically the same crosslinked thermoplastic material described above.

The thermoplastic material useful in preparing the high performance hoses in accordance with the present invention can be any thermoplastic polymer having reactive sites, such as —NCO, —NH$_2$, —OH, etc., along the polymer chain or pendant which are capable of undergoing a crosslinking reaction in the presence of a crosslinking agent such as an isocyanate. Typical examples of such thermoplastic polymers include, but are not limited to, polyurethanes; and may include polyamides such as nylon, e.g., nylon 6, nylon 66, nylon 4, nylon 11, nylon 12, nylon 6/12, nylon 6/10, etc.; polyesters such as polyethylene terephthalate; copolyesters such as Hytrel, a copolyester manufactured by DuPont; and the like. The thermoplastic polymer may be used alone or as a blend of two or more of the thermoplastic polymers. In a particularly preferred aspect of the invention, the thermoplastic polymer is a thermoplastic polyurethane. The thermoplastic polyurethane is typically produced by the condensation reaction of an isocyanate such as a diisocyanate and hydroxy-containing compounds such as polyols and glycols, which may be derived, e.g., from alkylene oxides or by oxidation of alkenes. The thermoplastic polyurethane preferably has an NCO:OH ratio of less than 1 where the end groups are predominantly—NCO. If the NCO:OH ratio is substantially higher than 1.0 then an OH group—containing chemical material having functionality of greater than 2.0, preferably 3.0 can be used.

The crosslinking agent of the present invention can be any suitable polyfunctional compound which reacts with the reactive sites on the thermoplastic material to crosslink the thermoplastic polymer. The preferred crosslinking agent is an isocyanate which contains at least 2.1, preferably more, functional groups which react with the reactive sites on the thermoplastic polymer. Other crosslinking agents may include peroxides, e.g., dicumyl peroxide, 2,5-dimethyl-2, 5-di(t-butylperoxy)hexane, 2,5-dimethyl-2,5-di(t-butylperoxy)hexane-3, 1,1-bis(t-butylperoxy)hexene-3, t-butylperoxybenzoate, and the like; polyols such as aromatic and cyclic polyols, e.g., hexafluoroisopropylidene-bis-(4-hydroxyphenyl) hydroquinone, isopropylidene-bis-(4-hydroxyphenyl), etc.; polyamines such as hexamethylenediamine carbamate, alicyclic diamine carbamate, dicinnamilidene, hexamethylenediamine, and the like; cyanurates such as triallyl cyanurate (TAC); isocyanurates such as triallyl isocyanurate (TAIC); and the like; polymeric isocyanates and diisocyanates, such as diphenylmethane-4,4'diisocyanate (MDI). Crosslinking agents containing at least two and preferably more than two functional groups such as TAC, TAIC, isocyanates, mixtures of isocyanates and polymeric isocyanates having functionality of more than 2.0 are found to be particularly useful. The isocyanate reactant is preferably a polyisocyanate, i.e., the isocyanate has a functionality of at least 2.1 and preferably greater than 2.1 for crosslinking to happen. In the thermoplastic polyurethane, the functionality must be at least 2.1. Typically, the crosslinking agent will be added to the vulcanizate in an amount of about 1 to 10% and preferably about 1 to 5% by weight, based upon the weight of the vulcanizate.

The isocyanate can be liquid, powder or in the concentrate form. The typical example of the isocyanates are polymeric diphenylmethane diisocyanate (MDI), polymethylene polyphenylisocyanate (PMPPI), p-phenylene diisocyanate (PPDI), cyclohexane diisocyanate (CHDI).

If the polymer is rich in NCO content (NCO/OH ratio substantially more than 1), then crosslinking can be achieved by trihydroxy molecules or any other molecules having three functionality capable of reacting with —NCO groups (—OH, —NH$_2$).

Typically, an isocyanate having a functionality greater than 2 is mixed with a thermoplastic polyurethane having an NCO:OH ratio of about 1 in an extruder, in a proportion so that the mixture is melt processable and rich in isocyanate. The isocyanate and the thermoplastic polyurethane can be mixed by blending the components in the proper proportions outside the extruder and subsequently introducing the components into the extruder as a mixture, or the isocyanate and thermoplastic polyurethane components may be metered separately into the extruder to be processed.

The extruder is maintained at a temperature sufficient to heat the thermoplastic polyurethane and the isocyanate components to a temperature where they become very reactive and begin to crosslink forming an extruded crosslinked thermoplastic polyurethane product which has the physical characteristics necessary for use as a high performance hose and cover.

The crosslinked thermoplastic hose of the invention is particularly useful in the manufacture of high performance hoses such as power steering hoses. In addition to exhibiting superior abrasion resistance and tear strength, the hose has the ability to withstand the adverse effects of high temperature and chemical degradation. The manufacture of the crosslinked thermoplastic hose of the present invention does not require the use of a mandrel as is commonly required in the prior art. The hoses can be extruded to close tolerance; they are light weight and recyclable; and, in addition to superior heat resistance and chemical resistance, they have better abrasion and tear resistance than prior art materials.

Conventional additives such as carbon black, heat stabilizers, e.g., antioxidants, lubricants, plasticizers, processing aids, and the like may be incorporated into the thermoplastic polyurethane before or during processing in amounts generally known in the art to provide the desired effect for which they are added.

EXAMPLE

5% diphenylmethane-4,4'diisocyanate (MDI) having a functionality of 2.3 was metered into the feed-throat of an extruder having 24:1 L/D and having a general purpose screw. The temperature profile was held at 410–500° F. The polymer material extruded was thermoplastic polyether polyurethane having 95A hardness. A heat stabilizer in an amount of 5% was also added along with the polymer. The melt temperature of the polymer composition was 407° F. The resultant extrudate was very shiny and had good adhesion to yarns treated with adhesive. The hose was dipped in methylene chloride where it remained for a period of 24 hours with improved effects to the hose.

Although the invention has been described and exemplified herein with respect to the preferred embodiments thereof, it is to be understood that the invention is not limited to the embodiments, and that variations can be made therein without departing from the scope of the invention.

What is claimed is:

1. A method for preparing a high performance crosslinked thermoplastic polyurethane tubular member for use in the manufacture of a dimensionally oriented power steering hose capable of withstanding high temperature and having chemical resistant characteristics, said method comprising:

adding to an extruder a thermoplastic polyurethane and an isocyanate crosslinking agent; and extruding said thermoplastic polyurethane and said isocyanate crosslinking agent at an elevated temperature and in the absence of a mandrel, wherein said thermoplastic polyurethane tubular member crosslinks during processing.

2. The method of claim 1 wherein said crosslinking agent is present in an amount of about 1 to 10% by weight of said thermoplastic polymer.

3. The method of claim 2 wherein said crosslinking agent is present in an amount of about 1 to 5% by weight of said thermoplastic polymer.

4. The method of claim 1 wherein said thermoplastic polyurethane and said isocyanate are pre-mixed in the desired ratio prior to being introduced into the extruder.

5. The method of claim 1 wherein said thermoplastic polyurethane and said isocyanate are metered into the extruder separately to provide a predetermined ratio of thermoplastic polyurethane to isocyanate.

6. The method of claim 1 wherein said thermoplastic polyurethane has a ratio of NCO:OH of less than about 1.

7. The method of claim 1 wherein said thermoplastic polyurethane is a polyester polyurethane.

8. The method of claim 2 wherein said crosslinking agent is present in an amount of about 1 to 5% by weight of said thermoplastic polyurethane.

9. The method of claim 1 wherein said crosslinking agent has a functionality of at least 2.1.

10. The method of claim 1 wherein said isocyanate is a diisocyanate.

11. The method of claim 10 wherein said diisocyanate is diphenylmethane-4,4' diisocyanate.

12. The method of claim 10 wherein said crosslinking agent is a mixture of polymeric diisocyanates.

13. The method of claim 1 wherein said thermoplastic polyurethane and said crosslinking agent are pre-mixed in a desired ratio prior to being introduced into the extruder wherein the thermoplastic polymer hose crosslinks during processing.

14. The method of claim 1 wherein said thermoplastic polymer and said crosslinking agent are metered into the extruder separately to provide a predetermined ratio of thermoplastic polymer to crosslinking agent.

15. The method of claim 1 wherein said crosslinked thermoplastic polyurethane tubular member is used as an inner tubular member in said power steering hose.

16. The method of claim 1 wherein said crosslinked thermoplastic polyurethane tubular member is used as an outer cover in said power steering hose.

17. A high performance crosslinked thermoplastic polyurethane tubular member for use in the manufacture of a dimensionally oriented power steering hose, said thermoplastic polyurethane tubular member being prepared in accordance with a method which comprises adding to an extruder a thermoplastic polyurethane, and an isocyanate crosslinking agent; and extruding said thermoplastic polyurethane and said isocyanate crosslinking agent at an elevated temperature and in the absence of a mandrel, wherein said thermoplastic polyurethane tubular member crosslinks during processing.

18. The method of claim 1 wherein said dimensionally oriented power steering hose includes a first crosslinked thermoplastic polyurethane tubular member as a inner tubular member, and a second crosslinked thermoplastic polyurethane tubular member as an outer cover on said inner tubular member.

19. The method of claim 1 wherein said dimensionally oriented power steering hose is a curved power steering hose.

20. A dimensionally oriented power steering hose comprising a first high performance crosslinked thermoplastic polyurethane tubular member as an inner tubular member, and a second high performance crosslinked thermoplastic polyurethane tubular member as an outer cover on said inner tubular member, said first high performance crosslinked thermoplastic polyurethane tubular member and said second high performance crosslinked thermoplastic polyurethane tubular member being prepared by adding to an extruder a thermoplastic polyurethane and an isocyanate crosslinking agent; and extruding said thermoplastic polyurethane and said isocyanate crosslinking agent at an elevated temperature and in the absence of a mandrel, wherein the first and second tubular members crosslink during processing.

21. The dimensionally oriented power steering hose of claim 20 wherein said hose is curved.

* * * * *